United States Patent
Hoge et al.

[19]

[11] Patent Number: 6,099,431
[45] Date of Patent: Aug. 8, 2000

[54] METHOD FOR OPERATING A TRACTION DRIVE AUTOMATIC TRANSMISSION FOR AUTOMOTIVE VEHICLES

[75] Inventors: Forrest William Hoge, Whitmore Lake; Daniel Warren McCarrick, Canton, both of Mich.

[73] Assignee: Ford Global Technologies, Inc., Dearborn, Mich.

[21] Appl. No.: 09/306,503

[22] Filed: May 6, 1999

[51] Int. Cl.[7] .................................................. F16H 37/02
[52] U.S. Cl. ......................... 475/216; 475/214; 475/219
[58] Field of Search .................................. 475/216, 215, 475/214, 207, 219; 476/42, 40

[56] References Cited

U.S. PATENT DOCUMENTS

| | | | |
|---|---|---|---|
| 4,628,766 | 12/1986 | De Brie Perry | 475/216 |
| 4,662,240 | 5/1987 | Greenwood | 475/216 |
| 4,768,398 | 9/1988 | Greenwood | 475/216 |
| 4,872,371 | 10/1989 | Fellows | 475/216 |
| 5,368,529 | 11/1994 | Machida | 476/42 |
| 5,607,372 | 3/1997 | Lohr | 475/216 |

FOREIGN PATENT DOCUMENTS 1288749  4/1971  United Kingdom ................... 475/216

*Primary Examiner*—Charles A. Marmor
*Assistant Examiner*—Ankur Parekh
*Attorney, Agent, or Firm*—Frank G. McKenzie

[57] ABSTRACT

A method for operating an automatic traction drive transmission for use in motor vehicles having a first gear unit for operation in an infinitely variable mode and a second gear unit for operation in a continuously variable mode includes connecting the first gear unit to the transmission output, disconnecting the second gear unit from the first gear unit, and changing the speed ratio of the variator to produce low forward and low reverse ranges, or connecting the second gear unit to the first gear unit, disconnecting the first gear unit from the transmission output, and changing the speed ratio of the variator to produce high mode low and high forward ranges.

7 Claims, 1 Drawing Sheet

| Friction Element Application Chart | | |
|---|---|---|
| Range | CL1 | CL2 |
| FWD Low | X | |
| REV Low | X | |
| Synchronous | X | X |
| FWD High | | X |

METHOD FOR OPERATING A TRACTION DRIVE AUTOMATIC TRANSMISSION FOR AUTOMOTIVE VEHICLES

BACKGROUND OF THE INVENTION

1. Field of the Invention

The present invention relates to the field of automatic transmissions for motor vehicles. More particularly it pertains to a method for operating such a transmission having a traction drive variator of the toroidal type.

2. Description of the Prior Art

One type of a continuously variable transmission typically includes a toroidal drive having at least one pair of traction discs, which often react upon each other and are rotatably supported in a housing along an axis facing one another to define a toric cavity between them. A motion transmitting traction roller is disposed in the cavity. The traction roller is frictionally engaged with the discs in circles of varying diameters depending on the transmission ratio, and is so supportive that it can be moved to initiate a change in the transmission ratio. A traction drive continuously variable drive can have more than one cavity and may be used, for example, to form part of an infinitely variable transmission.

A common type of continuously variable transmission includes a toroidal drive having dual cavities, which are defined by two torsionally coupled outboard traction discs, which react upon each other, and two inboard discs, which are positioned between the outboard discs and also react upon each other. One dual cavity toroidal drive of the "off-center type" is disclosed in U.S. Pat. No. 5,368,529. An off-center toroidal drive is usually considered to have an included angle of less than 180 degree between the traction contacts, i.e., where the roller contacts the discs. An on-center toroidal drive is usually considered to have an included angle of about 180 degree. The included angle is the angle formed by the lines between the center of the toric cavity and the traction contact on the engaged discs. The usual method for transmitting power through a dual cavity design of the "off-center type" is to input the power to the two outboard discs and use parallel shafting and gearing to transmit power from the inboard discs.

One gear mesh used to effect this parallel shafting is usually trapped between the inboard discs. Such a two-shaft system is bulky and difficult, if not impossible, to fit into the available space provided for the transmission of a number of vehicles. In addition, it is often necessary to return to the original center line when transmitting power. In the past, this has required a second gear mesh to be used, in addition to the gear mesh between the inboard discs. Single cavity toroidal drives are also known to take up more space than desired.

Therefore, there is a need for a toroidal type transmission capable of inputting and outputting power along the same axis without having to use parallel shafting. U.S. Pat. No. 5,607,372 describes an axial transmission of this type. Such a coaxial-axial drive transmission takes up less space than parallel shaft transmissions and can therefore be used in applications with tighter space constraints. In addition, it is easier and less expensive to package a coaxial-axial drive transmission in a housing than to package a parallel shaft transmission.

Transmissions of this type in the prior art do not have enough speed ratio span to overdrive the variator output. Instead, in infinitely variable transmissions of this type, upon shifting from a low mode to a high mode, the speed ratio produced by the variator is reduced and the transmission speed ratio increases as a result of the increase in the speed ratio of the gearset. To reduce the variator speed ratio the rollers are rotated to the low mode configuration from the higher speed ratio configuration to which they had progressed while accelerating the vehicle from a stop.

Transmissions operating in this way are difficult to control effectively. It is preferred that the variator speed ratio increase continually when the gearset is shifted to a higher speed range without being decreased to a low mode of operation.

SUMMARY OF THE INVENTION

One feature of the transmission controlled by the method of this invention is a planetary gearset having a carrier connected to the transmission input, and a sun gear connected to the output of a traction drive. The traction drive is a toroidal drive having two coupled traction discs, which react at least torsionally, preferably both torsionally and axially, with one another through the carrier. The toroidal drive can be a dual cavity type, with two outboard traction discs and one inboard traction disc element or two separate inboard traction discs disposed between the outboard discs. The toroidal drive can also be a single cavity type. One of the traction discs rotates with the input shaft; the carrier rotates with the input shaft and the other traction disc.

It is an object of this invention to provide a coaxial traction drive transmission that operates in an infinitely variable mode including a geared neutral condition and in a continuously variable mode. It is another object to provide such a transmission in which transmission speed ratios are increased by progressively increasing the speed ratios produced by the variator as the motor vehicle accelerates from a stop. In accomplishing this result, the variator underdrives its output discs as the vehicle accelerates from a stop and continually increases the variator speed ratios into the overdrive range without decreasing the variator speed ratio, even upon changing the operating mode of the transmission at the synchronous point where the torque flow path changes by alternately engaging and disengaging two clutches that control the gearsets.

In realizing these objects and advantages a method for operating a traction drive transmission, having a traction drive variator driveably connected to a transmission input, a first gear unit driveably connected to the transmission input and variator output, a second gear unit driveably connected to the first gear unit, includes the steps of driveably connecting the first gear unit and the transmission output; operating the variator to overdrive the variator output with respect to the speed of the transmission input such that the transmission output drives the vehicle in a rearward direction; and operating the variator to underdrive the variator output with respect to the speed of the transmission input such that the transmission output drives the vehicle in a forward direction.

DESCRIPTION OF THE PREFERRED EMBODIMENT

Figures 1, 2:
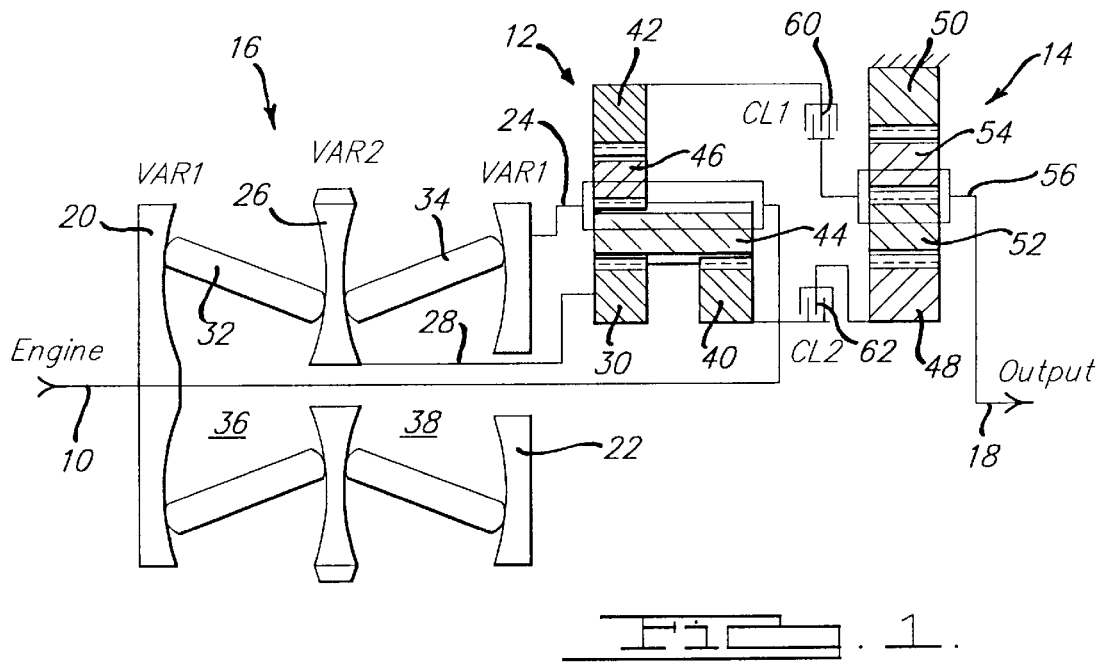
FIG. 1 is a schematic diagram of a traction drive transmission according to this invention.
FIG. 2 is a friction element application chart showing the engaged and disengaged status of the clutches that correspond to each of the operating ranges of the transmission of FIG. 1.

Referring to FIG. 1, a transmission according to this invention includes an input shaft 10 driven by an internal combustion engine, electric motor or other power source, and including a planetary gearset 12, a compound planetary gearset 14, a toroidal traction drive variator 16, various elements driveably connecting components of the gearsets and variator, and an output shaft 18.

Toroidal variator 16 includes first input discs 20, driveably connected directly to the input shaft 10, and second input discs 22, driveably connected to shaft 10 and the carrier 24 of the planetary gearset 12. The variator output discs 26 are driveably connected through a sleeve shaft 28 to a first sun gear 30 of gearset 12. The variator discs are mutually spaced axially and define toroidal cavities 36, 38, each cavity containing a set of spaced, rotating, angularly displaceable rollers 32, 34, each roller set driveably engaged with an input disc and output disc. Rollers of the set 32 transmit torque between input discs 20 and output discs 26; rollers of the set 34 transmit torque between input discs 22 and the output discs 26 A drive ratio control mechanism tilts or inclines the axes of the rollers through arcs, thereby changing the location of contact of the rollers on the discs, the speed of the output disc relative to the speed of the input discs, and the torque transmitted between the input discs and output discs. Output discs 26 rotate in the opposite direction from that of the input discs about the axis of input shaft 10.

The dual cavity toroidal drive 16 includes two inboard traction discs 26 formed as one integral element mounted on shaft 28. However, inboard discs 26 can also be two separate discs which are positioned back-to-back and simply coupled together in a conventional manner to operate in unison. An example of a dual cavity toroidal drive having dual inboard discs is disclosed in U.S. Pat. No. 5,368,529, which is incorporated in its entirety herein by reference.

A toric cavity is defined between each outboard disc 20 and 22 and the inboard disc element 26. Each pair of traction rollers 32, 34 are mirror images of the other pair. The rollers are so supported that they can be moved to produce a change in the transmission ratio.

Each roller is actuated to vary its diameter and to provide a normal force at its contact with the corresponding discs to sufficiently support the traction forces needed to effect a change in speed ratio. The outboard discs 20 and 22 impinge on the traction rollers, causing the traction rollers to rotate. As they rotate, the traction rollers impinge on and rotate the inboard disc element 26 in a direction opposite to that of the rotating outboard discs.

In addition to first sun gear 30, the first epicyclic gearset 12 includes a second sun gear 40; a ring gear 42; a long planet pinion 44 in continuous meshing engagement with sun gears 30 and 40; a second set of planet pinions 46 in continuous meshing engagement with ring gear 42 and planet pinion 44; and a carrier 24 driveably connected to input shaft 10 and output disc set 22 for rotatably supporting the planet pinion sets 44 and 46.

The second compound planetary gearset 14 includes a sun gear 48; ring gear 50 surrounding the sun gear 48; a set of planet pinions 52 continually meshing with sun gear 48; a second set of planet pinions 54 in continuous meshing engagement with ring gear 50 and planet pinion set 52; and a carrier 56 driveably connected to output shaft 18 for rotatably supporting the planet pinions of sets 52 and 54. Ring gear is continually fixed to the transmission housing, and carrier 56 is fixed to output shaft 18.

The operation of gearsets 12 and 14 is controlled by a first clutch 60, adapted to alternately driveably connect carrier 56 and ring gear 42 when the clutch is engaged and to release that connection by disengaging clutch 60. A second clutch 62 is adapted alternately to driveably connect sun gear 40 and sun gear 48 by engaging the clutch and to release that connection when the clutch is disengaged.

Throughout this description, reference is made to preferred gear and pinion sizes and to preferred overdrive and underdrive speed ratios produced by variator 16. In a preferred embodiment of this invention, sun gears 30, 40 have 81 teeth, ring gear 42 has 199 teeth, and planet pinions 46, 44 each have 56 teeth. With regard to the components of gearset 14 in the preferred application, sun gear 48 has 47 teeth, ring gear 50 has 105 teeth, and each of the planet pinions 52, 54 has 26 teeth.

The transmission is capable of operating in a geared neutral condition with clutch 60 engaged and clutch 62 disengaged. In order to produce the geared neutral condition for the preferred embodiment, the roller sets 32, 34 of variator 16 are arranged angularly within the toroidal cavities 36, 38 such that the speed of output discs 26 is approximately −1.457 times the speed of input shaft 10. This corresponds to a variator speed ratio of 1.457. The variator speed ratio is defined as the absolute value of the ratio of the speed of the output discs 26 to the speed of the input shaft 10. Sun gear 30 is driven at the speed of discs 26, carrier 24 is driven directly from input discs 20, 22 at the same speed as that of input shaft 10 and the output is taken at ring gear 42. With the transmission so disposed, the speed of ring gear 42, carrier 56 and output shaft 18 is substantially zero.

The vehicle accelerates or drives away in the forward direction from the geared neutral condition by changing the drive ratio of variator 16 to the low mode forward ratio. A low mode forward range, having an overall speed ratio of about 0.40, is produced by setting the angular position of rollers 32, 34 such that they contact variator discs 26 at a radially outer position and contact variator input discs 20, 22 at radially inner position, the opposite configuration from that showing in FIG. 1. In low mode forward, discs 26 and sun gear 30 are driven at approximately −0.47 times the speed of input shaft 10, and carrier 24 is driven at the speed of shaft 10. With clutch 60 engaged, ring gear 42 drives carrier 56 and output shaft 18 through clutch 60 at approximately 0.402 times the speed of shaft 10.

The vehicle accelerates from stop while the transmission continues to operate in the low mode forward condition, i.e., with clutch 60 engaged and clutch 62 disengaged. A synchronous point occurs when the rotational speeds of the components connected by clutch 62, sun gears 40 and 48, are substantially equal, and the speed of the components connected by clutch 60, carrier 56 and ring gear 42, are substantially equal. At the synchronous point, clutch 62 is engaged and clutch 60 is disengaged, thereby placing the transmission in the high mode low condition.

During a transition from the low mode forward mode to the synchronous point, the angular inclination of rollers 32, 34 is maintained substantially constant, and the output variator discs 26 are driven at approximately −0.470 times the speed of input shaft 10.

The transmission operates in the forward high mode high condition with clutch 62 engaged and clutch 60 disengaged. In the high mode high condition, the angular inclination of rollers 32, 34 is changed gradually from the underdrive position described above with reference to the low mode forward and high mode low conditions to the overdrive position shown in FIG. 1 where the rollers 32, 34 contact the input discs 20, 22 at radially outer positions and contact the output variator discs 26 at radially inner positions. As the variator changes in this way from the underdrive to the overdrive positions, carrier 24 is driven at the speed of shaft 10 through variator input discs 20, 22 and sun gear 30 is driven directly from variator output discs 26 in a preferable range from approximately −0.470 to −2.120 times the speed of input shaft 10. The speed and torque of sun gear 30 is transferred through pinion set 44 to sun gear 40, which drives sun gear 48, due to the engagement of clutch 62, at the same speed as that of sun gears 30, 40. Ring gear 50 continually provides a torque reaction due to its engagement with the transmission housing. With variator 16 at the maximum overdrive position, the transmission output shaft 18 is driven by carrier 56 of gearset 14 at approximately 1.718 times the speed of the input shaft.

The transmission of FIG. 1 can operate in a low mode reverse condition upon disengaging clutch 62, engaging clutch 60, and adjusting the variator to operate in the overdrive condition, i.e., with the rollers 32, 34 generally in the position shown in FIG. 1. With the variator so disposed, sun gear 30 is driven at approximately −2.12 times the speed of input shaft 10, ring gear 50 provides the torque reaction, and the output is taken at ring gear 42, which drives carrier 56 and output shaft 18 at approximately −0.270 times the speed of input shaft 10, in the preferred embodiment.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for controlling operation of a transmission of a motor vehicle, the transmission having a traction drive variator driveably connected to a transmission input, a first epicyclic gear unit driveably connected to the transmission input and variator output, a second epicyclic gear unit, the method comprising the steps of:

driveably connecting the first epicyclic gear unit and the transmission output;

driveably disconnecting the first epicyclic gear unit from the second epicyclic gear unit;

operating the variator to overdrive the variator output with respect to the speed of the transmission input such that the transmission output drives the vehicle in a rearward direction; and operating the variator to underdrive the variator output with respect to the speed of the transmission input such that the transmission output drives the vehicle in a forward direction.

2. The method of claim 1, further comprising:

operating the transmission in a geared neutral condition by operating the variator to overdrive the variator output with respect to the speed of the transmission input such that the transmission output speed is substantially zero.

3. The method of claim 1, further comprising:

driveably disconnecting the first epicyclic gear unit and transmission output when the variator produces synchronous speed;

driveably connecting the second epicyclic gear unit and a component of the first epicyclic gear unit when the variator produces synchronous speed; and operating the variator to overdrive the variator output with respect to the speed of the transmission input such that the transmission output drives the vehicle in the forward direction.

4. A method for controlling operation of a transmission for a motor vehicle, the transmission having a traction drive variator driveably connected to a transmission input, a first epicyclic gear unit driveably connected to the transmission input and variator output for driving the transmission output in an infinitely variable operating mode, a second epicyclic gear unit adapted for drive connection to the first gear unit for driving the transmission output in a continuously variable operating mode, the method step comprising the steps of:

driveably connecting the first epicyclic gear unit and the transmission output and disconnecting the first epicyclic gear unit from the epicyclic second gear unit;

operating the variator to overdrive the variator output at a first speed ratio relative to speed of the transmission input such that the transmission output drives the vehicle in a rearward direction; and operating the variator to underdrive the variator output at a second speed ratio less that the first speed ratio such that the transmission output drives the vehicle in a forward direction.

5. The method of claim 4, further comprising:

operating the transmission in a geared neutral condition by operating the variator to overdrive the variator output at a third speed ratio whose magnitude is less than the first speed ratio and greater than the second speed ratio such that the transmission output speed is substantially zero.

6. The method of claim 4, further comprising:

driveably connecting the second epicyclic gear unit and a component of the first epicyclic gear unit;

driveably disconnecting the first epicyclic gear unit and the transmission output;

operating the variator to overdrive the variator output such that the transmission output drives the vehicle in the forward direction.

7. The method of claim 6, further comprising:

increasing the overdrive speed ratio of the variator such that the speed of the variator output is in a range bounded by the first speed ratio and second speed ratio, and the vehicle is driven in a forward direction.

* * * * *